(12) United States Patent
Mastrocola et al.

(10) Patent No.: US 10,744,985 B2
(45) Date of Patent: Aug. 18, 2020

(54) ELECTRO-HYDROSTATIC BRAKE CONTROL

(71) Applicant: GOODRICH CORPORATION, Charlotte, NC (US)

(72) Inventors: Naison E Mastrocola, Goshen, CT (US); Michael Abbott, Tempe, AZ (US); Tyler Arsenault, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 19 days.

(21) Appl. No.: 15/957,224

(22) Filed: Apr. 19, 2018

(65) Prior Publication Data

US 2019/0322259 A1 Oct. 24, 2019

(51) Int. Cl.
| | | |
|---|---|---|
| *B60T 10/04* | (2006.01) | |
| *B60T 8/17* | (2006.01) | |
| *B60T 13/66* | (2006.01) | |
| *B60T 13/74* | (2006.01) | |
| *B64C 25/44* | (2006.01) | |

(52) U.S. Cl.
CPC ............ *B60T 10/04* (2013.01); *B60T 8/1703* (2013.01); *B60T 13/662* (2013.01); *B60T 13/745* (2013.01); *B64C 25/44* (2013.01)

(58) Field of Classification Search
CPC ........ B60T 8/1703; B60T 8/40; B60T 8/4018; B60T 8/4031; B60T 8/404; B60T 8/4054; B60T 10/04; B60T 13/662; B60T 13/745; B60T 8/4009; B60T 13/686
See application file for complete search history.

(56) References Cited

U.S. PATENT DOCUMENTS

| | | | | |
|---|---|---|---|---|
| 3,537,259 A | * | 11/1970 | Russler ................. | B60T 13/686 60/471 |
| 4,610,485 A | * | 9/1986 | Watanabe ............. | B60T 8/4009 188/72.3 |
| 5,316,110 A | * | 5/1994 | Null ........................ | B60T 1/065 188/112 R |
| 6,113,197 A | * | 9/2000 | Kuroki .................... | B60T 7/042 303/11 |

(Continued)

FOREIGN PATENT DOCUMENTS

| | | |
|---|---|---|
| CN | 102442291 | 5/2012 |
| CN | 103786877 | 5/2014 |

(Continued)

OTHER PUBLICATIONS

European Patent Office, European Search Report dated Aug. 12, 2019 in Application No. 19168862.1.

*Primary Examiner* — Thomas J Williams
(74) *Attorney, Agent, or Firm* — Snell & Wilmer L.L.P.

(57) ABSTRACT

An electro-hydrostatic brake system includes a motor controller configured to receive a brake command, a motor in electronic control communication with the motor controller, and a pump mechanically coupled to the motor. In various embodiments, the electro-hydrostatic brake system further includes a hydraulic tank fluidly coupled in fluid providing communication with the pump, a hydraulic pressure rail fluidly coupled in fluid receiving communication with the pump, and a brake actuator in fluid communication with the hydraulic pressure rail and configured to exert a braking force on a wheel, wherein the braking force is directly modulated by the motor and/or the pump.

15 Claims, 4 Drawing Sheets

(56) References Cited

U.S. PATENT DOCUMENTS

| | | | | |
|---|---|---|---|---|
| 6,474,751 | B1* | 11/2002 | Yamaguchi | B60T 7/12 |
| | | | | 303/116.4 |
| 7,000,997 | B1* | 2/2006 | Wolff | B60T 7/042 |
| | | | | 303/11 |
| 7,128,376 | B2 | 10/2006 | Williams et al. | |
| 7,234,785 | B1* | 6/2007 | McCann | B60T 1/005 |
| | | | | 188/265 |
| 8,287,054 | B2* | 10/2012 | Beer | B60T 8/368 |
| | | | | 303/10 |
| 8,720,197 | B2 | 5/2014 | Persson et al. | |
| 9,050,949 | B2* | 6/2015 | Miyazaki | B60T 7/042 |
| 9,616,870 | B2 | 4/2017 | Knechtges et al. | |
| 9,738,263 | B2 | 8/2017 | Jung | |
| 2008/0092641 | A1* | 4/2008 | Cahill | B60T 8/52 |
| | | | | 73/121 |
| 2010/0292889 | A1* | 11/2010 | Cahill | B60T 8/1703 |
| | | | | 701/29.1 |
| 2014/0366522 | A1 | 12/2014 | Masutani et al. | |
| 2016/0001753 | A1 | 1/2016 | Georgin et al. | |
| 2016/0076558 | A1* | 3/2016 | Gomm | F15B 7/006 |
| | | | | 60/327 |
| 2017/0028973 | A1* | 2/2017 | Arienti | B60T 13/142 |
| 2018/0099650 | A1 | 4/2018 | Jones et al. | |

FOREIGN PATENT DOCUMENTS

| | | |
|---|---|---|
| CN | 103803063 | 5/2014 |
| CN | 106741877 | 5/2017 |
| CN | 106741878 | 5/2017 |
| CN | 104859626 | 7/2017 |
| CN | 107061566 | 8/2017 |
| GB | 2344390 | 6/2000 |

* cited by examiner

ELECTRO-HYDROSTATIC BRAKE CONTROL

FIELD

The present disclosure relates to brake control architectures, and more specifically to an electro-hydrostatic brake control architecture.

BACKGROUND

Aircraft typically have brakes on the wheels to slow the aircraft during aborted takeoffs, landings, and/or while taxiing. Conventional aircraft generally employ a hydraulic system that is controlled by a braking and steering control unit, and such a system generally includes long lengths of hydraulic lines, large volumes of fluid, electric valves and the associated wiring for stepping down the source hydraulic pressure, and hydraulic cylinders for converting the hydraulic power to translational motion. Accordingly, controlling a brake assembly of an aircraft using such a conventional hydraulic system may have various inefficiencies, may be susceptible to failure at multiple locations throughout the aircraft, may be excessively heavy, and/or may occupy an excessive amount of space in the aircraft.

SUMMARY

In various embodiments, the present disclosure provides an electro-hydrostatic brake system that includes a motor controller configured to receive a brake command, a motor in electronic control communication with the motor controller, and a pump mechanically coupled to the motor. In various embodiments, the electro-hydrostatic brake system further includes a hydraulic tank fluidly coupled in fluid providing communication with the pump, a hydraulic pressure rail fluidly coupled in fluid receiving communication with the pump, and a brake actuator in fluid communication with the hydraulic pressure rail and configured to exert a braking force on a wheel, wherein the braking force is directly modulated by the motor and/or the pump.

In various embodiments, the pump is a hydrostatic pump, such as a hydrostatic positive displacement pump. In various embodiments, the brake actuator is a first brake actuator of a plurality of brake actuators in fluid communication with the hydraulic pressure rail. In various embodiments, the electro-hydrostatic brake system further includes a hydraulic return rail in fluid communication with the plurality of brake actuators and the hydraulic tank. The electro-hydrostatic brake system may further include a bleed valve coupled to the hydraulic return rail between the plurality of brake actuators and the hydraulic tank.

In various embodiments, the system further includes a pressure sensor coupled to the hydraulic pressure rail and in electronic feedback communication with the motor controller. In various embodiments, the system further comprises a displacement sensor coupled to the brake actuator and in electronic feedback communication with the motor controller. In various embodiments, the electro-hydrostatic brake system may include multiple, substantially redundant channels. That is, according to various embodiments, the motor controller is a first motor controller and the electro-hydrostatic brake system further includes a second motor controller configured to receive the brake command. Similarly, the motor may be a first motor and the electro-hydrostatic brake system may further include a second motor in electronic control communication with the second motor controller; the pump may be a first hydrostatic pump and the electro-hydrostatic brake system may further include a second hydrostatic pump mechanically coupled to the second motor; the hydraulic pressure rail may be a first hydraulic pressure rail and the electro-hydrostatic brake system may further include a second hydraulic pressure rail fluidly coupled in fluid receiving communication with the second hydrostatic pump; and the brake actuator may be a first brake actuator, the braking force may be a first braking force, and the electro-hydrostatic brake system may further include a second brake actuator in fluid communication with the second hydraulic pressure rail that is configured to exert a second braking force on the wheel.

Also disclosed herein, according to various embodiments, is an electro-hydrostatic brake system that includes the components described above, with the motor controller having a processor and a tangible, non-transitory memory. The tangible, non-transitory memory may be configured to communicate with the processor, and the tangible, non-transitory memory may have instructions stored thereon that, in response to execution by the processor, cause the electro-hydrostatic brake system to perform various operations. The various operations may include receiving, by the processor of the motor controller, a brake command and, in response to the motor controller receiving the brake command, actuating the motor to deliver a hydrostatic pressure to the hydraulic pressure rail via the pump such that the brake actuator exerts a braking force on a wheel.

In various embodiments, the operations further includes receiving, by the processor of the motor controller, feedback from the feedback sensor; and in response to the motor controller receiving the feedback, actuating the motor to change the hydrostatic pressure delivered to the hydraulic pressure rail via the pump such that the brake actuator changes the braking force. Still further, the system may include a hydraulic return rail in fluid communication with the brake actuator and the hydraulic tank and a bleed valve coupled to the hydraulic return rail between the brake actuator and the hydraulic tank, wherein the operations further include receiving, by the processor of the motor controller, feedback from the feedback sensor and, in response to the motor controller receiving the feedback, actuating the bleed valve to change the hydrostatic pressure in the hydraulic pressure rail via the hydraulic return rail such that the braking force changes.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
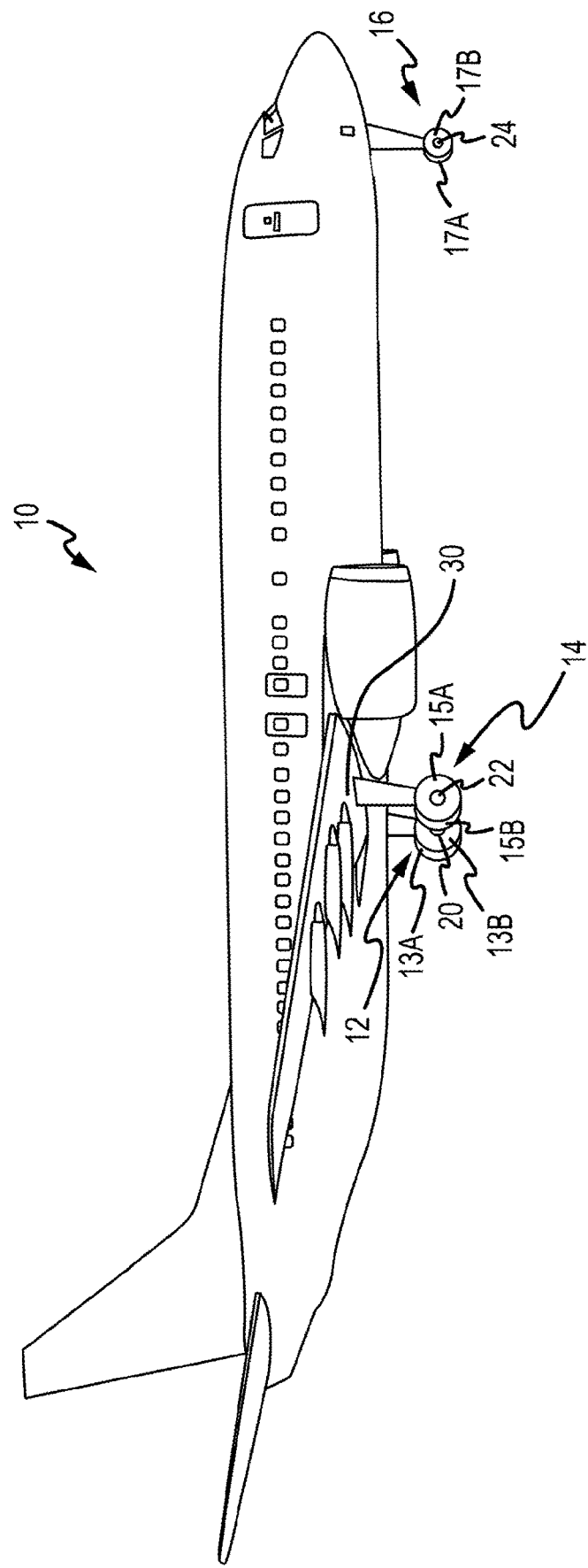
FIG. 1 illustrates an aircraft, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a control architecture for a brake assembly that includes a motor mechanically coupled to a pump, such as a hydrostatic pump, configured to deliver hydraulic pressure on-demand to a local hydraulic pressure rail that is fluidly coupled to one or more brake actuators. Accordingly, the electro-hydrostatic brake system does not rely on conventional hydrodynamic pumps but instead utilizes a pump that is configured to provide and maintain a desired hydraulic pressure locally, thereby foregoing conventional hydraulic valves that would otherwise be used in a conventional assembly to step down an excessive hydraulic pressure to a desired local, on-demand pressure. While numerous details are included herein pertaining to the implementation of the electro-hydrostatic brake system in an aircraft, the system and its related method disclosed herein may be implemented in various other applications.

Referring now to FIG. 1, in accordance with various embodiments, an aircraft 10 may include landing gear such as main landing gear 12, main landing gear 14 and nose landing gear 16. Main landing gear 12, main landing gear 14, and nose landing gear 16 may generally support aircraft 10 when aircraft 10 is not flying, allowing aircraft 10 to taxi, take off and land without damage. Main landing gear 12 may include wheel 13A and wheel 13B coupled by an axle 20. Main landing gear 14 may include wheel 15A and wheel 15B coupled by an axle 22. Nose landing gear 16 may include nose wheel 17A and nose wheel 17B coupled by an axle 24. In various embodiments, aircraft 10 may comprise any number of landing gears and each landing gear may comprise any number of wheels. Main landing gear 12, main landing gear 14, and nose landing gear 16 may each be retracted for flight.

Aircraft 10 may also include a brake assembly, which may be coupled to a landing gear of the aircraft 10 and configured to control braking at the wheels of the landing gear. The brake assembly may be controlled by a hydraulic brake system of aircraft 10, which may include a collection of subsystems that produce output signals for controlling the braking force and/or torque applied at each wheel (e.g., wheel 13A, wheel 13B, wheel 15A, wheel 15B, etc. wheel 17A, and/or wheel 17B). The hydraulic brake system may communicate with the brake assemblies of each landing gear (e.g., main landing gear 12, main landing gear 14, and/or nose landing gear 16), and each brake assembly may be mounted to each wheel to apply and release braking force on one or more wheels (e.g., as described above).

The brakes of an aircraft 10 may include a non-rotatable wheel support, a wheel (e.g., wheel 13A, wheel 13B, wheel 15A, wheel 15B, wheel 17A, and/or wheel 17B) mounted to the wheel support for rotation, and a brake disk stack. The brake stack may have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk stack and a brake head may be located at the front end. The brake head may house one or more actuator rams that extend to compress the brake disk stack against the back plate, or the brake disk stack may be compressed by other means. Torque is taken out by the stator disks through a static torque tube or the like. The actuator rams may be hydraulically operated actuator rams, although brakes in various embodiments may use pneumatically or electrically operated actuator rams.

Figure 2:
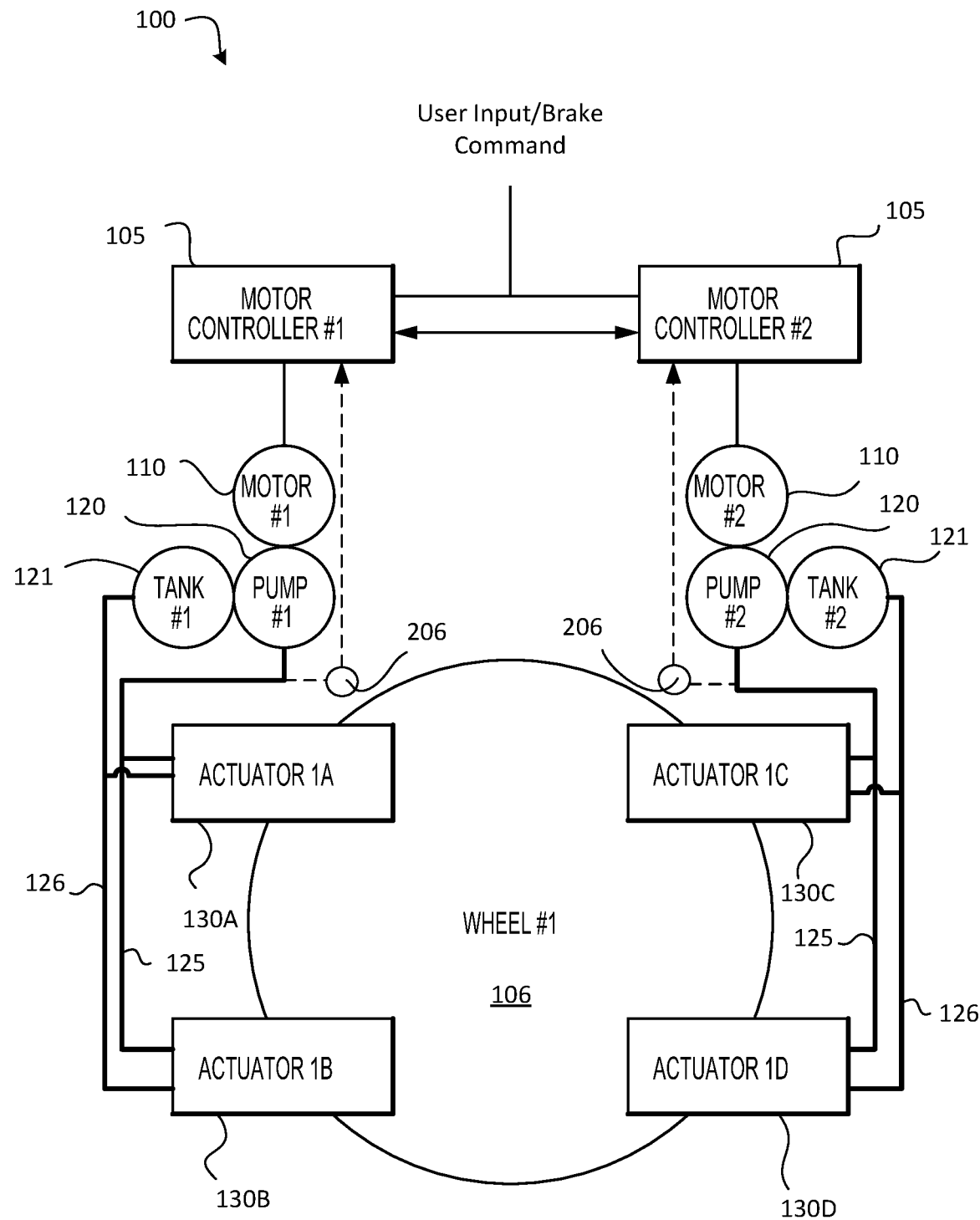
FIG. 2 is a schematic block diagram of an electro-hydrostatic brake system, in accordance with various embodiments.

In various embodiments, and with reference to FIG. 2, an electro-hydrostatic brake system 100 is provided. While the electro-hydrostatic brake system 100 depicted in FIG. 2 generally shows a dual/redundant architecture (e.g., two motor controllers 105, two motors 110, etc), the electro-hydrostatic brake system 100 may have a single channel or the brake system 100 may have more than the two channels shown in FIG. 2. For example, the electro-hydrostatic brake system may include multiple channels (redundancy for safety purposes) and may include different channels for inboard/outboard assemblies, right/left assemblies, etc.

The electro-hydrostatic brake system 100 may be utilized in the aircraft 10. The electro-hydrostatic brake system 100 may include one or more motor controller(s) 105 that are configured to receive a user input or some other form a brake command. In various embodiments, the user input may be from a user input interface, such as a pedal, handle, or other pilot actuator/interface for demanding primary or emergency braking. The user input interface may be located in a cockpit of the aircraft 10 and may be manually actuated by a user/pilot to request or demand a desired braking force be applied at the wheels/landing gear 106. In various embodiments, the user input/brake command may be from an autobrake control module or from another control unit, such as braking and steering control unit.

In various embodiments, the electro-hydrostatic brake system 100 further includes a motor 110 in electronic control communication with the motor controller 105. That is, the motor controller 105 may be configured to receive a braking request or a braking command and may send a corresponding braking signal to the motor 110. The motor 110, according to various embodiments, is mechanically coupled to a pump 120. The electro-hydrostatic brake system 100 also includes a hydraulic tank 121 fluidly coupled in fluid providing communication with the pump 120, according to various embodiments. Still further, the electro-hydrostatic brake system 100 includes a hydraulic pressure rail 125 fluidly coupled in fluid receiving communication with the pump 120, according to various embodiments. That is, the pump 120 is configured to deliver a desired, on-demand, hydrostatic hydraulic pressure from the hydraulic tank 121 to the hydraulic pressure rail 125, according to various embodiments. Accordingly, the pump 120 may be a hydrostatic pump, such as a hydrostatic positive displacement pump. In various embodiments, the pump 120 may be a variable displacement pump that is controlled and driven by modulating its speed to produce the desired hydrostatic hydraulic pressure. One or more brake actuators (e.g., brake actuators 130A, 130B on the left side/channel and brake actuators 130C, 130D on the right side/channel) may be coupled in fluid communication with the hydraulic pressure rail 125 and may be configured to exert a braking force on the wheel 106.

In various embodiments, the hydraulic pressure rail 125 does not include a hydraulic pressure metering valve or other such mechanism for stepping down the pressure from a source/pump pressure to a desired pressure. That is, the motor controller 105 controls the desired hydrostatic pressure in the hydraulic pressure rail 125 by actively actuating the motor 110 that is mechanically coupled to the pump 120, and thus there is no need for a hydraulic pressure valve between the pump 120 and the one or more brake actuators 130A, 130B, 130C, 130D. As used herein, the terms "pump" and "hydrostatic pump" generally refer to a pump that is configured to deliver a desired, on-demand hydrostatic pressure. Thus, the hydraulic pressure in the hydraulic pressure rail between the hydrostatic pump 120 and the brake actuator(s) 130A, 130B, 130C, 130D is substantially the same along its entire length (i.e., no step down in pressure), according to various embodiments. Accordingly, the braking force exerted by the brake actuator(s) 130A, 130B, 130C, 130D is directly modulated by the motor 110 and the hydrostatic pump 120, and not by a hydraulic valve, according to various embodiments. Further, such a configuration provides each brake actuator 130A, 130B, 130C, 130D on the common, hydraulic pressure rail 125 with the same hydrostatic pressure and thus with the same braking force. Additionally, weight and cost may be saved by sourcing multiple brake actuators on the common, hydraulic pressure rail 125.

The motor controller 105 may be integrated into computer systems onboard aircraft 10 such as, for example, a brake control unit (BCU), a full authority digital engine control (FADEC), an engine-indicating and crew-alerting system (EICAS), and/or the like. The motor controller 105 may also be a standalone computer system separate from aircraft 10 and in electronic communication with aircraft 10, as described in further detail herein. The motor controller 105 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor of the motor controller 105 may be configured to implement various logical operations in response to execution of instructions, for example, instructions stored on the non-transitory memory (e.g., tangible, computer-readable medium). As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the hydrostatic pump 120 may be a positive displacement pump. In various embodiments, the electro-hydrostatic brake system 100 includes a hydraulic return rail 126 in fluid communication with the one or more brake actuators 130A, 130B, 130C, 130D and the hydraulic tank 121. In various embodiments, and with momentary reference to FIG. 3, a bleed valve 127 may be fluidly coupled to the hydraulic return rail 126 between the plurality of brake actuators 130A, 130B, 130C, 130D and the hydraulic tank. The bleed valve 127 may be controlled by the motor controller 105 and may be configured to facilitate depressurization of the hydraulic pressure rail 125 in response to a braking command calling for exertion of a reduced braking force. That is, the brake actuators 130A, 130B, 130C, 130D may be coupled in fluid receiving communication with the hydraulic pressure rail 125 and the brake actuators 130A, 130B, 130C, 130D may be coupled in fluid providing communication with the hydraulic return rail 126. Accordingly, the bleed valve 127 may be actuated to rapidly decrease hydraulic pressure in response to a command for reduced braking force. The electro-hydrostatic brake system 100 of FIG. 2 may also include bleed valve 127, and thus control of the system 100 may be implemented using bleed valve 127 and feedback from pressure sensor 206.

Figure 3:
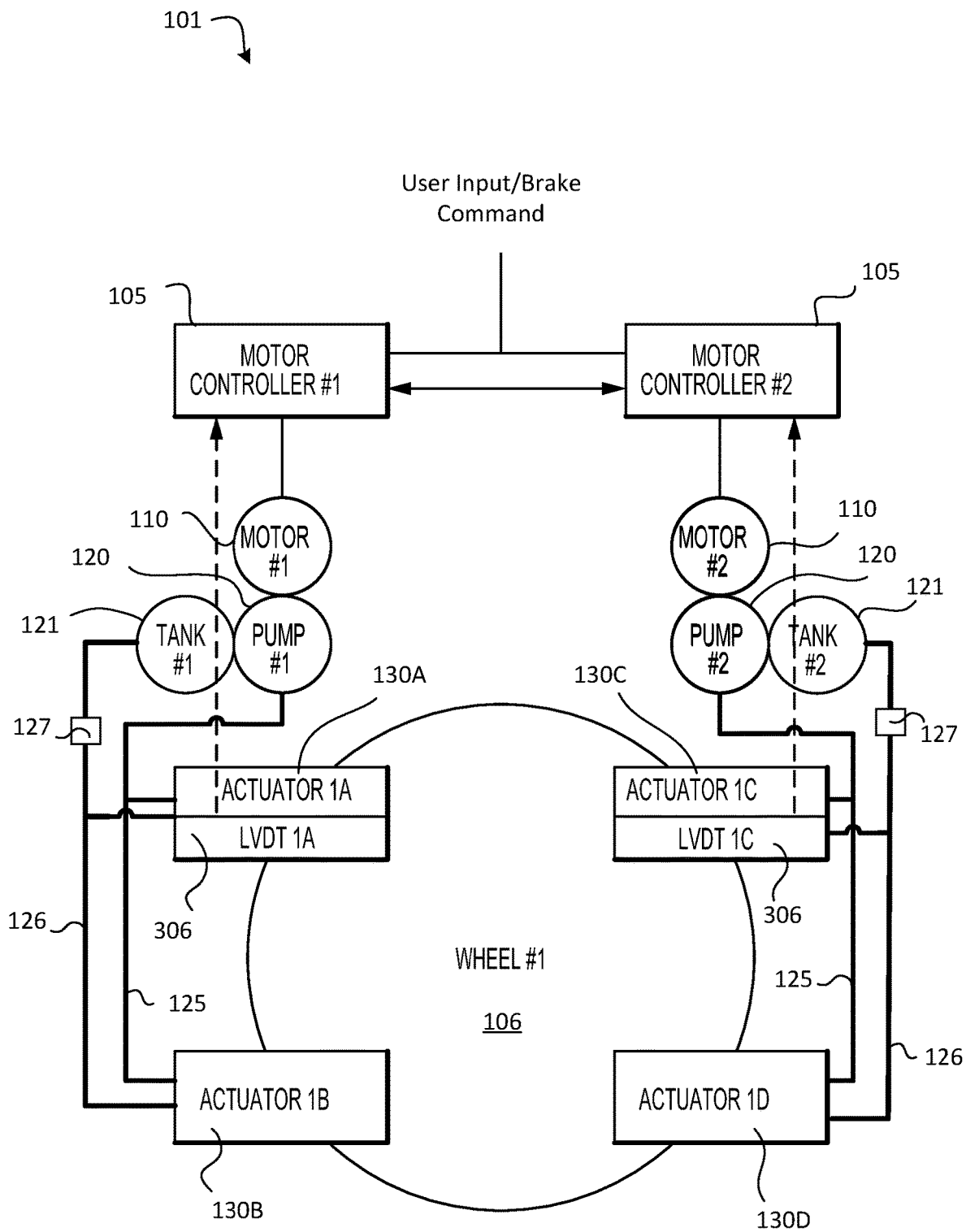
FIG. 3 is a schematic block diagram of an electro-hydrostatic brake system, in accordance with various embodiments.

In various embodiments, and with reference to FIGS. 2 and 3, the electro-hydrostatic brake system 101 includes a feedback sensor. Generally, the feedback sensor is configured to send feedback to the motor controller 105 in order to cause the motor controller 105 to actuate the motor 110, which in turn mechanically actuates the hydrostatic pump 120 to change the hydrostatic pressure delivered to the hydraulic pressure rail 125, thereby changing the braking force exerted by the brake actuator(s) 130A, 130B, 130C, 130D on the wheel 106. The feedback sensor may be include a pressure sensor 206, as shown in FIG. 2, and/or a displacement sensor 306, as shown in FIG. 3. The pressure sensor 206 may be coupled to the hydraulic pressure rail 125 and may be in electronic feedback communication with the motor controller 105 and the displacement sensor 306, such as a linear variable differential transformer, may be coupled to the brake actuators 130A, 130B, 130C, 130D and may be in electronic feedback communication with the motor controller 105. In various embodiments, the electro-hydrostatic brake system may be implemented without feedback.

Figure 4:
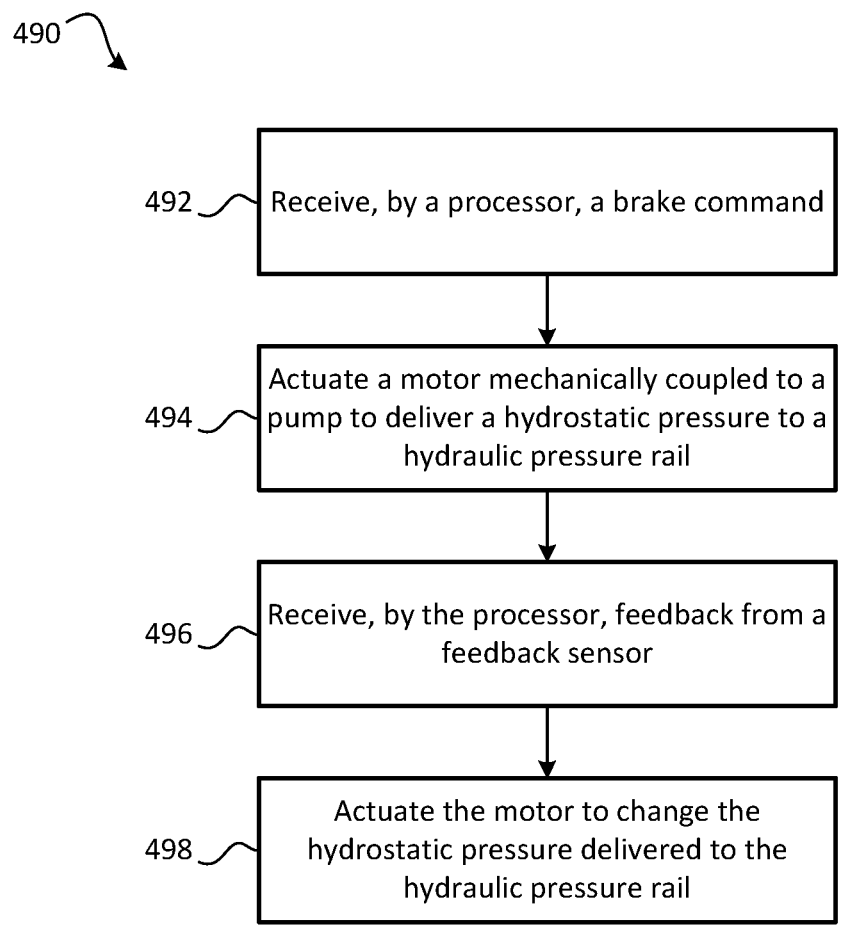
FIG. 4 is a schematic flow chart diagram of a method of controlling an electro-hydrostatic brake system, in accordance with various embodiments.

In various embodiments, and with reference to FIG. 4, a method 490 of controlling the electro-hydrostatic brake system 100/101 is provided. The method 490 includes, according to various embodiments, receiving, by the processor, a brake command at step 492 and, in response to the brake command, actuating a motor mechanically coupled to a hydrostatic pump to deliver a hydrostatic pressure to a hydraulic pressure rail at step 494. The method 490 may optionally further include receiving, by the processor, feedback from a feedback sensor at step 496 and, in response to the feedback, actuating the motor to change the hydrostatic pressure delivered to the hydraulic pressure rail at step 498.

In various embodiments, the method 490 may also include, in response to receiving, by the processor, feedback from the feedback sensor, actuating a bleed valve coupled to a hydraulic return rail that extends in fluid communication between the brake actuator and a hydraulic tank, to change the hydrostatic pressure in the hydraulic pressure rail via the hydraulic return rail such that the braking force changes. As mentioned above, the feedback sensor may be a pressure sensor and/or a displacement sensor, and the feedback pressure and/or the feedback displacement may be utilized by the processor of the brake controller to actuate the motor to change the hydrostatic pressure in the hydraulic pressure rail to change the braking force.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electro-hydrostatic brake system comprising:
a motor in electronic control communication with a motor controller;
a pump mechanically coupled to the motor;
a hydraulic tank fluidly coupled with the pump;
a hydraulic pressure rail fluidly coupled in fluid receiving communication with the pump;
a brake actuator in fluid communication with the hydraulic pressure rail and configured to exert a braking force on a wheel, wherein the braking force is directly modulated by at least one of the motor and the pump; and
a hydraulic return rail in fluid receiving communication with the brake actuator, wherein the hydraulic return rail is separate from the hydraulic pressure rail;
wherein the brake actuator is a first brake actuator of a plurality of brake actuators in fluid communication with the hydraulic pressure rail and the hydraulic return rail, wherein the plurality of brake actuators is configured to exert the braking force on the wheel;
wherein application of the braking force is directly modulated by the at least one of the motor and the pump without use of a hydraulic step down valve; and
wherein there are no pressure reducing valves disposed between the pump and the plurality of brake actuators along the hydraulic pressure rail.

2. The electro-hydrostatic brake system of claim 1, wherein the pump is a hydrostatic positive displacement pump.

3. The electro-hydrostatic brake system of claim 1, wherein the hydraulic pressure rail is configured so that a hydrostatic pressure in the hydraulic pressure rail is substantially the same along its length, such that the hydrostatic pressure from the pump is substantially the same as the pressure in the plurality of brake actuators causing the application of the braking force.

4. The electro-hydrostatic brake system of claim 1, further comprising a pressure sensor coupled to the hydraulic pressure rail and in electronic feedback communication with the motor controller.

5. The electro-hydrostatic brake system of claim 1, further comprising a displacement sensor coupled to the brake actuator and in electronic feedback communication with the motor controller.

6. The electro-hydrostatic brake system of claim 1, further comprising the motor controller, wherein:
the motor controller is a first motor controller configured to receive a brake command and the electro-hydrostatic brake system further comprises a second motor controller configured to receive the brake command;

the motor is a first motor and the electro-hydrostatic brake system further comprises a second motor in electronic control communication with the second motor controller;

the pump is a first hydrostatic pump and the electro-hydrostatic brake system further comprises a second hydrostatic pump mechanically coupled to the second motor;

the hydraulic pressure rail is a first hydraulic pressure rail and the electro-hydrostatic brake system further comprises a second hydraulic pressure rail fluidly coupled in fluid receiving communication with the second hydrostatic pump;

the brake actuator is a first brake actuator, the braking force is a first braking force, and the electro-hydrostatic brake system further comprises a second brake actuator in fluid communication with the second hydraulic pressure rail that is configured to exert a second braking force on the wheel; and the hydraulic return rail is a first hydraulic return rail and the electro-hydrostatic brake system further comprises a second hydraulic return rail in fluid receiving communication with the second brake actuator.

7. An electro-hydrostatic brake system comprising:
a motor controller;
a motor in electronic control communication with the motor controller;
a pump mechanically coupled to the motor;
a hydraulic tank fluidly coupled with the pump;
a hydraulic pressure rail fluidly coupled in fluid receiving communication with the pump;
a brake actuator in fluid communication with the hydraulic pressure rail;
a feedback sensor coupled in electronic feedback communication with the motor controller and coupled to at least one of the hydraulic pressure rail and the brake actuator;
a hydraulic return rail in fluid communication with the brake actuator and the hydraulic tank; and
a bleed valve coupled to the hydraulic return rail between the brake actuator and the hydraulic tank;
wherein the motor controller comprises a processor;
wherein a tangible, non-transitory memory is configured to communicate with the processor, the tangible, non-transitory memory having instructions stored thereon that, in response to execution by the processor, cause the electro-hydrostatic brake system to perform operations comprising:
    receiving, by the processor of the motor controller, a brake command;
    in response to the motor controller receiving the brake command, actuating the motor to deliver a hydrostatic pressure to the hydraulic pressure rail via the pump such that the brake actuator exerts a braking force on a wheel, wherein the hydraulic pressure rail is configured such that the hydrostatic pressure from the pump along the entire length of the hydraulic pressure rail to the brake actuator is substantially the same;
    receiving, by the processor of the motor controller, feedback from the feedback sensor;
    in response to the motor controller receiving the feedback, actuating the motor to change the hydrostatic pressure delivered to the hydraulic pressure rail via the pump such that the brake actuator changes the braking force; and
    in response to the motor controller receiving the feedback, actuating the bleed valve to decrease the hydrostatic pressure in the hydraulic pressure rail via the hydraulic return rail such that the braking force changes; and
    wherein there are no pressure reducing valves disposed between the pump and the brake actuator along the hydraulic pressure rail.

8. The electro-hydrostatic brake system of claim 7, wherein the feedback sensor is a pressure sensor coupled to the hydraulic pressure rail, wherein receiving, by the processor of the motor controller, the feedback comprises receiving a feedback pressure from the pressure sensor.

9. The electro-hydrostatic brake system of claim 7, wherein the feedback sensor is a displacement sensor coupled to the brake actuator, wherein receiving, by the processor of the motor controller, the feedback comprises receiving a feedback displacement from the displacement sensor.

10. A method of controlling a braking force of an electro-hydrostatic system, the method comprising:
    receiving, by a processor of a motor controller, a brake command;
    commanding, by the processor and in response to the motor controller receiving the brake command, actuating a motor mechanically coupled to a pump to deliver a hydrostatic pressure to a hydraulic pressure rail via the pump such that a brake actuator exerts a braking force on a wheel, wherein the hydraulic pressure rail is configured such that the hydrostatic pressure from the pump along the entire length of the hydraulic pressure rail to the brake actuator is substantially the same;
    receiving, by the processor of the motor controller, feedback from a feedback sensor; and
    in response to the motor controller receiving the feedback, actuating the motor to change the hydrostatic pressure delivered to the hydraulic pressure rail via the pump such that the brake actuator changes the braking force;
    wherein a hydraulic return rail is also fluidly coupled to the brake actuator and is separate from the hydraulic pressure rail; and
    wherein there are no pressure reducing valves disposed between the pump and the brake actuator along the hydraulic pressure rail.

11. The method of claim 10, further comprising:
    receiving, by the processor of the motor controller, feedback from the feedback sensor;
    in response to the motor controller receiving the feedback, actuating a bleed valve, coupled to the hydraulic return rail that extends in fluid communication between the brake actuator and a hydraulic tank, to change the hydrostatic pressure in the hydraulic pressure rail via the hydraulic return rail such that the braking force changes.

12. The method of claim 10, wherein the feedback sensor is a pressure sensor coupled to the hydraulic pressure rail, wherein the method further comprises
    receiving, by the processor of the motor controller, a feedback pressure from the pressure sensor;
    in response to the motor controller receiving the feedback pressure, actuating the motor to change the hydrostatic pressure to the hydraulic pressure rail via the pump such that the brake actuator changes the braking force.

13. The method of claim 10, wherein the feedback sensor is a displacement sensor coupled to the brake actuator, wherein the method further comprises receiving, by the processor of the motor controller, a feedback displacement from the displacement sensor;
    in response to the motor controller receiving the feedback displacement, actuating the motor to change the hydrostatic pressure to the hydraulic pressure rail via the pump such that the brake actuator changes the braking force.

14. The method of claim 10, wherein the pump is a hydrostatic positive displacement pump.

15. The method of claim 10, wherein the brake actuator is a first brake actuator of a plurality of brake actuators in fluid communication with the hydraulic pressure rail and the hydraulic return rail.

* * * * *